United States Patent
Rosenberg

(10) Patent No.: US 6,253,242 B1
(45) Date of Patent: Jun. 26, 2001

(54) GROUP SAMPLING METHOD FOR CONNECTIONLESS NETWORKS

(75) Inventor: Jonathan David Rosenberg, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,815

(22) Filed: Aug. 31, 1998

Related U.S. Application Data
(60) Provisional application No. 60/095,683, filed on Aug. 7, 1998.

(51) Int. Cl.[7] .................................................. G06F 17/60
(52) U.S. Cl. .......................... 709/224; 709/219; 709/223; 709/226; 709/235; 709/243; 370/390; 370/392; 370/395; 370/399; 370/256; 370/409; 707/203
(58) Field of Search .................................. 370/392, 395, 370/399, 409, 390, 256; 709/219, 223, 226, 235, 243, 224; 707/203

(56) References Cited

U.S. PATENT DOCUMENTS

| | | | | |
|---|---|---|---|---|
| 4,853,843 | * | 8/1989 | Echland ................................ | 707/203 |
| 5,511,168 | * | 4/1996 | Perlman et al. ...................... | 709/243 |
| 5,742,772 | * | 4/1998 | Sreenan ................................ | 709/226 |
| 5,799,145 | * | 8/1998 | Kuriyan ................................ | 709/223 |
| 5,799,154 | * | 8/1998 | Kuriyan ................................ | 709/223 |
| 5,831,975 | * | 11/1998 | Chen et al. .......................... | 370/256 |
| 6,085,238 | * | 7/2000 | Yuasa et al. ......................... | 709/223 |
| 6,088,344 | * | 7/2000 | Wales et al. ......................... | 370/329 |
| 6,108,493 | * | 8/2000 | Miller .................................... | 709/219 |
| 6,115,749 | * | 9/2000 | Golestani et al. ................... | 709/235 |
| 6,141,347 | * | 9/2000 | Shaughnessy ........................ | 370/390 |
| 6,181,697 | * | 1/2001 | Nuren berg et al. ................. | 370/390 |

FOREIGN PATENT DOCUMENTS

| | | | |
|---|---|---|---|
| WO 98/15133 | * | 4/1998 | (WO) . |
| WO-15133 | * | 9/1998 | (WO) . |
| WO-9849856 | * | 11/1998 | (WO) . |

OTHER PUBLICATIONS

Khalili K.M. "A system approach for planning, tuning and upgrading local area network" Colbal Telecommunications conference Dec. 2–5, 1991, pp. 658–663, vol. 1.*

Khalidi M. Yousef "Using multicast communication to locate resources in a LAN–based distributed system" IEEE Oct. 10, 1998, pp. 193–202.*

* cited by examiner

Primary Examiner—Glenton B. Burgess
Assistant Examiner—Seyed M. Safavian
(74) Attorney, Agent, or Firm—Jeffery J. Brosemer

(57) ABSTRACT

A bin based method for determining a group size estimate for applications utilizing connectionless networks. The method places an indicator of group participants who match the key under a mask into bins, where each bin corresponding to the number of bits in the mask used to determine the match. When the number of bits in the mask is increased from m to m+1, all of the participant indicators in bin m are moved into bin m+1. When the number of bits in the mask decreases from m+1 to m, however, no participant indicators are moved. When a refresh packet is received from a particular participant whose indicator is in bin k, but the current mask is m bits, for k>m., the indicator for that particular participant is moved from bin k to bin m. The group size estimate is then be obtained as $$\sum_{i=0}^{31} B(i)2^i$$

where B(I) is the number of users in the ith bin.

3 Claims, 2 Drawing Sheets

GROUP SAMPLING METHOD FOR CONNECTIONLESS NETWORKS

CROSS REFERENCE TO RELATED APPLICATION

This application claims the benefit of U.S. Provisional Application Ser. No. 60/095,683 filed Aug. 7, 1998.

FIELD OF THE INVENTION

The present invention relates generally to the field of telecommunications and in particular to a group sampling method for connectionless networks.

BACKGROUND OF THE INVENTION

There exist a number of emerging applications that make use of large scale multicast groups on the Internet. Such emerging applications include database replication, service discovery, distributed interactive simulations, and large scale voice and video conferencing. In many cases, these applications require each participant in the multicast group to keep a count of the other members in the multicast group. Such counts are often necessary for scaling feedback in order to perform congestion control or reliable multicast. Additionally, the number of participants in a multicast group is often dynamic, increasing and decreasing sharply at times. For example, in a multimedia conference, there will be a sharp increase in the number of participants when the session begins, and a sharp decrease in the number of participants when the session ends.

In order to effectively count the number of other participants, each participant may maintain a participant list that contains every other member of the multicast group heard from. For truly large scale applications, however, low power devices such as a telephone or TV set top boxes cannot adequately support sufficient memory to maintain a listing of each participant or group member.

The prior art has generally addressed this problem by employing various sampling mechanisms. These prior art sampling mechanisms store only a subset of the group members, yet allow a participant to keep a relatively accurate group size estimate. Specifically, the prior art has employed statistical sampling mechanisms in which group members maintain keys that are random and unique. Each participant in the group maintains a mask, with some number of bits, m, set. If the key of a participant matches the key of the local participant under the masking operation, the participant identifier is kept in the table of the local participant, otherwise its identifier is discarded. Additionally, the prior art has shown how the number of bits in the mask can be increased as group sizes grow, thereby minimizing the variance in the group size estimate for a given memory size. Despite such developments however, the prior art has not demonstrated an effective way to decrease the number of bits in the mask—an essential characteristic when the group membership decreases. Instead, the prior art has relied upon "corrective fudge factors" to compensate for the sampling errors. Unfortunately, however, these factors are inaccurate for those situations where group size decreases rapidly and oftentimes these factors may require a potentially unbounded number of mathematical operations if the group size oscillates rapidly.

Consequently, alternative methods of tracking group members of connectionless network activities are required.

SUMMARY OF THE INVENTION

I have developed a method for determining a group size estimate for applications utilizing connectionless networks. In contrast to prior art methods that simply track all participants who match a key in some kind of flat table, my method tracks participants who match the key under the mask by placing a participant identifier into bins, with each bin corresponding to the number of bits in the mask that match the key. According to my method, when the number of bits in the mask is increased from m to m+1, all of the participant identifiers in bin m are moved into bin m+1. When the number of bits in the mask decreases from m+1 to m, however, no participant identifiers are moved. Additionally, when a refresh packet is received from a particular participant whose participant identifier is in bin k, but the current mask is m bits, for k>m, the participant identifier for that particular participant is moved from bin k to bin m. The group size estimate is then be obtained as $$\sum_{i=0}^{31} B(i)2^i$$

where B(I) is the number of participants in the ith bin.

My approach has a number of advantages over prior art methods. Specifically, computation is always bounded for any given group size and estimates remain accurate even over highly dynamic groups with rapid oscillations. Additionally, my method provides a simple way to "favor" certain participants, so that they can be stored in the table even when their key doesn't match the key of the local participant under the masking operation.

Further features and advantages of the present invention will become apparent to those skilled in the art.

DETAILED DESCRIPTION OF THE INVENTION

Figure 1:
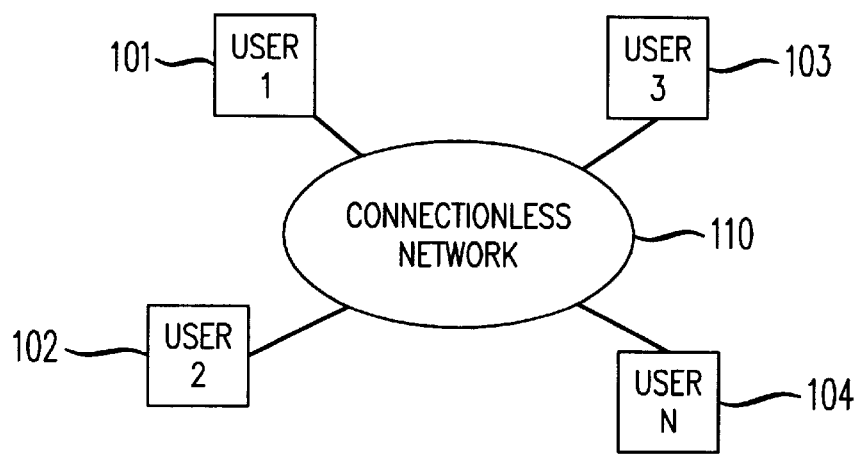
FIG. 1 is a schematic diagram of a number of users communicating over a connectionless network.

With reference now to FIG. 1, a number N(t) of users 101–104, or participants of a multicast group, are connected by a connectionless network 110 that provides a basic broadcast or multicast service. This service allows a packet sent by any one of the participants to be received by all of the other participants. Those skilled in the art will of course recognize that such connectionless networks and multicast groups are well known and a characteristic of these connectionless networks is that messages routed through the network 110 are routed independently of one another.

Each participant is uniquely identified by a key. This key is randomly chosen with a relatively large number of bits, i.e., 32. Each participant sends information occasionally to the multicast group. These packets always contain the key in addition to whatever data is being sent. A participant may also send a particular packet (i.e., a BYE packet) to the group, indicating that the participant is leaving and no longer a member of the group. Members that have not sent packets for some pre-determined amount of time may be considered by other members to have left the group ("timed out") as well, for example, in the case where the BYE is not sent or was lost.

The objective is for each group member to obtain an estimate L(t) of the number of other members, N(t), by watching the packets received, and storing a list of the session participants. As is generally understood and readily appreciated by those skilled in the art, some kind of list must be stored by each of the participants. Simple strategies such as "blind" packet counting cannot be employed, since this would mean that participants that send more than one packet (which is almost a certainty), are counted twice.

Figure 2:
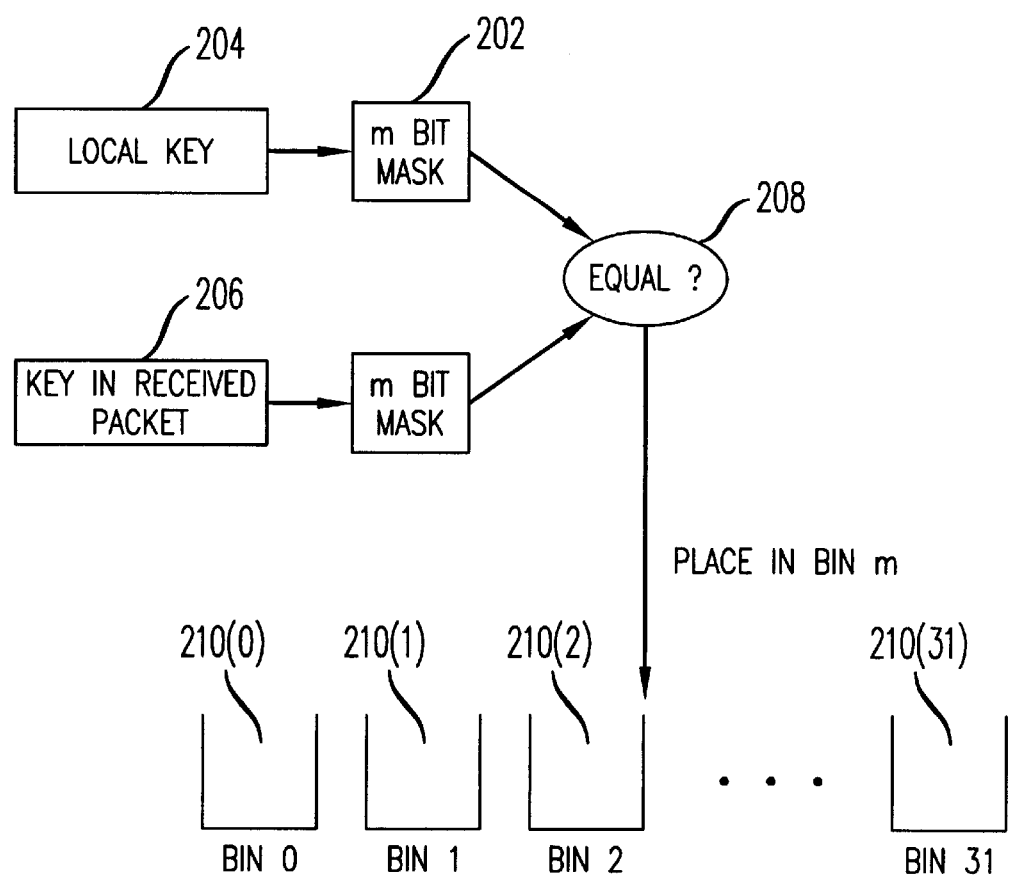
FIG. 2 is block diagram depicting the present invention.

With reference now to FIG. 2, there is shown a generalized flow and basic structures necessary for a participant to obtain a group size estimate according to the present invention. Specifically, each participant (not shown) in the group maintains a variable m, which represents the number of bits "set" in a mask 202. If the mask 202 is, for example, a 32 bit mask, then the mask 202 is constructed as a 32 bit value having the most significant m bits set to a binary "1", and the least significant 32-m bits are set to a binary "0". In this exemplary example, the masking operation may be as simple as a bitwise AND between the mask 202 and one or more keys.

As shown in FIG. 2, Local key 204 and received packet key 206 are bitwise ANDed with the m-bit mask 202. If the resulting 32 bit values are equal, the two keys (204, 206) match, else they do not. As can be further appreciated by one skilled in the art, a characteristic of my masking operation is that if there are m bits in the mask, on average 1 in $2^m$ keys should match. Importantly, any masking operation which provides this statistical guarantee will work for the purposes of my invention.

Shown further in FIG. 2 are a number of bins, i.e., Bin 0 210[0] through Bin 31 210[31]. Each participant maintains 31 bins, one bin for each individual bit in the mask that a participant was found to match. The bins are empty upon initialization and similarly, the variable m is also initialized to zero. When a packet is received by a local participant, according to the figure, the key in the packet is compared with a key of the local participant. If the key contained in the received packet matches the key of the local participant, the key contained in the received packet is placed in the mth bin, if it is not already present in that bin.

The bins themselves therefore represent the storage mechanism for holding the members of the group. We assume that there is a total of B keys which can be stored across all 32 bins. Let K be the total number of keys stored in all of the bins combined.

As the initial value of m is zero, all keys will match under the masking operation. For large groups, this can cause the number of stored keys K to increase rapidly. As K approaches B, the maximum storage allocated, the number of bits in the mask is increased from 0 to 1. All of the keys in the $0^{th}$ bin are rechecked using the new mask. Those that no longer match are discarded. Those that do match are placed in the $1^{st}$ bin. This will cause, on average, the number of keys to be reduced by one half. Again, as the number of keys increases as new packets with new keys arrive, the number of stored keys K may reach the limit B. The number of bits in the mask m is once again incremented and those users who no longer match are discarded, and the identifiers for participants in bin m are moved up to bin m+1.

When the group membership decreases, it may be necessary to decrease the number of bits in the mask. This is done, for example, when L (the group size estimate) divided by $2^m$ is less than B/4. When the number of bits in the mask is decreased, no participant identifiers are moved from bin to bin. However, as participants send packets, if a packet is received from a particular participant with a key thats already in some bin z, and the current number of bits in the mask m<z, the particular participant identifier is moved from bin m to bin z.

The group size estimate is computed using the formula:

$$L = \sum_{i=0}^{31} B(i)2^i;$$

where B(I) is the number of participants in the ith bin.

Advantageously, the mechanism also permits a user to favor particular participants. This means that a participant has its key stored even if it doesn't match the mask. This is accomplished by always placing the key of this participant in the $0^{th}$ bin.

Figure 3:
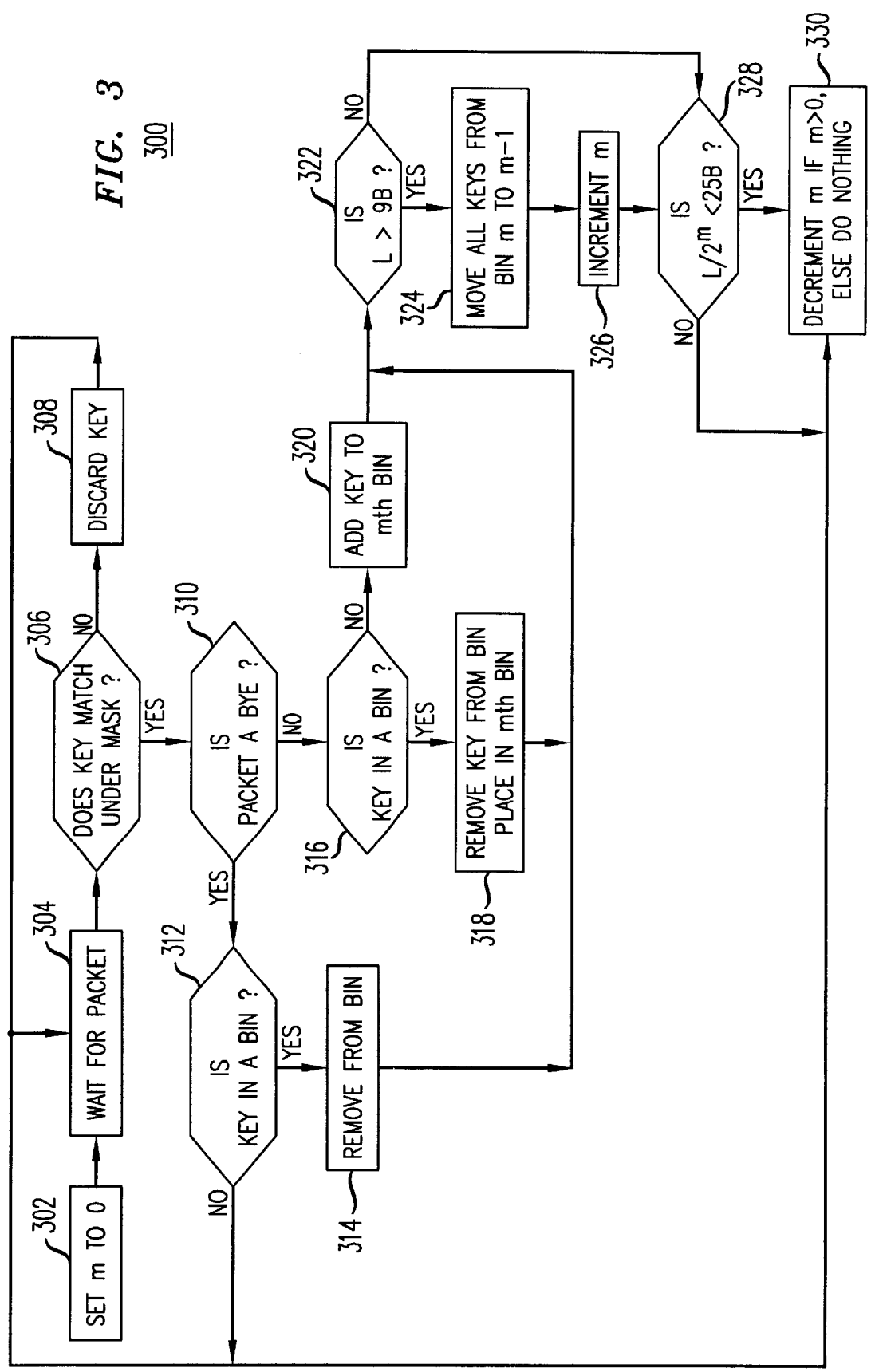
FIG. 3 is a flow diagram depicting the steps associated with the present invention.

With reference now to FIG. 3, there is shown a flowchart 300 depicting the method of the present invention. Specifically, initialization occurs in block 302, where ms is set for 0. As depicted in block 304, users or participants wait for packets and then determine whether a key contained within a received packet compares favorably under a masking operation (block 306). If not, the key contained within the received packet is discarded (block 308) and the participant again waits for additional packets (block 304).

Conversely, if the key contained within the received packet does favorably compare under the masking operation of block 306, that packet is further examined to determine whether it is of a particular type, i.e., a BYE packet (block 310). If the packet is a BYE packet or another packet that indicates that a participant is leaving the group, then a determination is made whether the key is already in a bin (block 312) and if so then the key is removed from the bin (block 314) is removed from the bin and further processing is performed (blocks 322–330). If, on the other hand, the key is not in a bin as determined at block 312, then the participant again waits for additional packets (block 304).

Returning now to the flow at block 310, if the received packet was not a BYE, or another packet indicating that the participant was leaving the group, then a check similar to that performed at block 312 is performed at block 316, namely whether the key contained in the received packet is contained in a bin. If the key is in a bin, then the key is removed from that bin and placed in the $m^{th}$ bin (block 316).

Additional processing (blocks 322–330) first determines whether a group size estimate L, is greater than 0.9 B where B is the number of participants within a particular bin. If the group size estimate is greater than 0.9 B, then all keys in bin m are moved to bin m+1 (block 324), and m is incremented (block 326).

Then (block 328), a determination is made whether $L/2^M$ is less than 0.25 B, if so then m is decremented if m>0, else nothing is done (block 330). After completing the processing indicated by block 330, control is again returned to block 304 where incoming packets are received.

The elements, features, steps and procedures described herein are intended to illustrate the preferred embodiments of the present invention, and are not to be regarded as limiting the scope of the invention. Accordingly, changes may be made in the combination and arrangement of the various elements, features, steps and procedures described herein without departing from the spirit and scope of the invention.

The invention claimed is:

1. A method for estimating the number of entities in a group whereby said entities each have a unique key and send data to one another over a connectionless network using a multicast mechanism, the method comprising the steps of:

receiving, by a receiving entity, a key unique to one of the other entities;

sampling the received key by comparing the received key with a mask, wherein said mask is constructed by assigning m bits in a binary word to 0 and the remaining bits to 1 and the comparison includes:
  performing a logical AND of the mask with the received key thereby producing a first resulting test word;
  performing a logical AND of the mask with a unique key associated with the entity performing the comparison thereby producing a second resulting test word; and
  accepting the received key when the first resulting test word is equal to the second resulting test word;
storing the received key in a bin of a group of bins corresponding to a sampling factor when the received key is acceptable according to the sampling operation such that the storing operation places the received key in bin m if said mask has m bits and wherein said storing operation moves a received key from bin z to bin m if there are m bits in said mask and said key is currently in bin z where z>m;
selectively moving received keys from one bin to another when the sampling factor changes, wherein said moving operation places those keys in bin m which are still accepted when the mask increases to m+1 bits into bin m+1 when said mask changes from m to m+1; and;
generating the estimate of the number of entities in the group from the number of received keys in stored each bin, wherein said estimate is generated according to the following relationship:

$$L = \sum_{i=0}^{31} B(i)2^i;$$

where B(i) is the number of keys contained in the ith bin.

2. The method according to claim 1 wherein said moving is performed when the estimate increases above a predetermined threshold.

3. The method according to claim 1 wherein said moving is performed when the estimate divided by $2^m$ decreases below a predetermined threshold.

* * * * *